(12) United States Patent
McBride

(10) Patent No.: US 9,145,157 B2
(45) Date of Patent: Sep. 29, 2015

(54) CORNER DOLLY SKATE

(71) Applicant: Jimontanae Rax McBride, Suffolk, VA (US)

(72) Inventor: Jimontanae Rax McBride, Suffolk, VA (US)

(*) Notice: Subject to any disclaimer, the term of this patent is extended or adjusted under 35 U.S.C. 154(b) by 0 days.

(21) Appl. No.: 14/567,084

(22) Filed: Dec. 11, 2014

(65) Prior Publication Data

US 2015/0108730 A1 Apr. 23, 2015

Related U.S. Application Data

(63) Continuation-in-part of application No. 13/920,232, filed on Jun. 18, 2013, now abandoned.

(51) Int. Cl.
*B62B 5/00* (2006.01)

(52) U.S. Cl.
CPC .................................. *B62B 5/0093* (2013.01)

(58) Field of Classification Search
CPC ...................................................... B62B 5/0093
USPC .............. 280/79.11, 32.6, 87.01, 7.1, 87.021, 280/87.043
See application file for complete search history.

(56) References Cited

U.S. PATENT DOCUMENTS

| | | | | |
|---|---|---|---|---|
| 375,406 A | * | 12/1887 | Wilson | 248/129 |
| 3,885,008 A | * | 5/1975 | Martin | 264/45.3 |
| 4,178,006 A | * | 12/1979 | Johnson | 280/79.11 |
| 4,699,391 A | * | 10/1987 | Syring | 280/79.11 |
| 5,472,220 A | | 12/1995 | Stephan | |
| 6,371,496 B1 | * | 4/2002 | Balolia | 280/35 |
| 7,140,622 B1 | | 11/2006 | Cantu | |
| 7,600,767 B2 | | 10/2009 | Lewis | |
| 8,567,798 B2 | * | 10/2013 | Rossini et al. | 280/47.35 |
| 8,807,579 B2 | * | 8/2014 | Lin | 280/47.131 |
| 2003/0075890 A1 | * | 4/2003 | Jacobs | 280/87.042 |
| 2009/0315285 A1 | * | 12/2009 | Glass | 280/47.17 |
| 2013/0187352 A1 | * | 7/2013 | Hassell et al. | 280/79.11 |
| 2014/0097587 A1 | * | 4/2014 | Szasz | 280/79.11 |

* cited by examiner

*Primary Examiner* — Brodie Follman
*Assistant Examiner* — Brian Cassidy
(74) *Attorney, Agent, or Firm* — Williams Mullen, PC

(57) ABSTRACT

A heavy duty corner skate dolly is provided. The dolly frames includes a rectangular shaped plate with a L-shaped angle riser welded or permanently screwed to its top surface. The dolly plate's bottom surface includes a hole or a plurality of holes that are routed into the plates surfaces with a depth that is arrange to accept an industrial magnet or a plurality of industrial magnets that are partially incased in a metal plated finish and attached to the bottom surface of the plate by a fastening cap or a plurality of fastening caps that are pressed into or welded to the bottom surface. A plurality of stem fitted swivel caster wheels are mounted to the rectangular shaped plate by inserting each swivel caster wheel into its corresponding caster fastening holes at the frames bottom and bolting each swivel caster wheel at the frames top by a plurality of corresponding spring washers, lock washers, and hexagon shaped nuts.

10 Claims, 4 Drawing Sheets

CORNER DOLLY SKATE

CROSS-REFERENCE TO RELATED APPLICATIONS

This application claims priority to and is a continuation-in-part of U.S. patent application Ser. No. 13/920,232 filed Jun. 18, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

A heavy duty wheeled corner dolly skate. More specifically, a heavy duty corner dolly skate for manually moving and transporting heavy ferromagnetic and non-ferromagnetic square or rectangular shaped objects, containers or boxes.

DESCRIPTION OF RELATED ART

Variations on dolly skates are known in the art. For example, U.S. Pat. No. 5,472,220 describes a bucket dolly in which wheels are attached at the bottom of a bucket to allow a person to transport materials without the need to pick up the bucket. U.S. Pat. No. 7,600,767 describes a dolly apparatus for moving heavy machinery with a recessed channel in the middle to assist in preventing heavy objects from moving or slipping while being transported on the dolly apparatus. Another example is U.S. Pat. No. 7,140,622 which describes a dolly skate for a movie camera with a detachable push handle and tripod leg recesses and the ability to attach other assemblies to it to guide it in linear movement or prevent movement.

BRIEF SUMMARY OF THE INVENTION

The present approach is a heavy duty corner skate dolly for manually moving and transporting heavy ferromagnetic and non-ferromagnetic objects, more preferably square or rectangular shaped objects, containers or boxes. The frame of the dolly is comprised of a plate with at least one riser welded or permanently screwed to its top surface.

The dolly plate's bottom surface includes a hole or a plurality of holes that are routed into the plates surfaces with a depth and shape that is arranged to accept an industrial magnet or a plurality of industrial magnets that are attached to the bottom surface of the plate by a fastening cap or a plurality of fastening caps that are pressed into or welded to the bottom surface.

The frame of the dolly includes a plurality of caster fastening holes at each corner or, where the frame is circular, a plurality of caster fastening holes, corresponding to at least three stem fitted swivel casters, appropriately spaced parallel to the edge of the frame. The caster fastening holes are arranged to accept a corresponding plurality of stem fitted swivel casters. The swivel casters wheels are mounted to the flame by inserting each swivel caster wheel into corresponding caster fastening holes at the frames bottom and bolting each swivel caster wheel at the frames top by a plurality of corresponding spring washers, lock washers, and hexagon shaped nuts.

Additionally, a system of four of the heavy duty wheeled corner skate dollies may be used to transport a rectangular heavy ferromagnetic or non-ferromagnetic object, in which each of the four dollies received a corner of the object and the industrial magnet(s) and/or the riser(s) ensure that the object is secure, while the fitted swivel casters allow the object to be moved manually. Further, heavy ferromagnetic or non-ferromagnetic objects of any geometric shaped may be moved using a system of casters provided that the riser(s), if present, are configured to receive the corners of the object being moved.

DETAILED DESCRIPTION OF THE INVENTION

Figure 1:
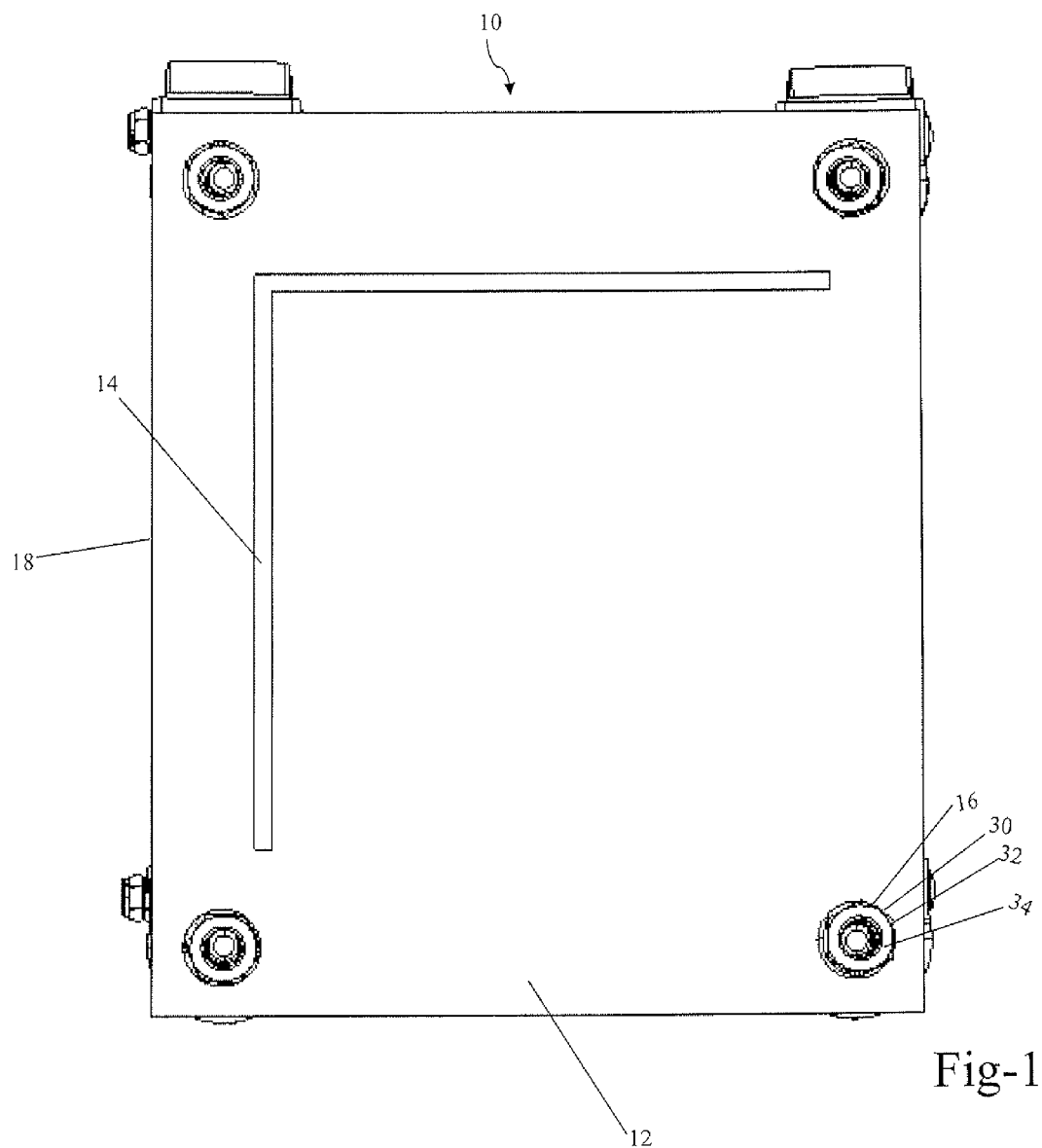
FIG. 1 is an upper perspective view of a dolly according to a preferred embodiment.

A heavy duty wheeled corner skate dolly for manually moving and transporting heavy ferromagnetic and non-ferromagnetic objects, more preferably square or rectangular shaped objects, containers or boxes. The frame of the dolly is comprised of a plate with at least one riser welded or permanently screwed to its top surface. In one preferred embodiment, the frame of the dolly is comprised of a rectangular shaped plate with a L-shaped angle riser welded or permanently screwed to its top surface. In another preferred embodiment, the frame of the dolly is comprised of a rectangular shaped plate with two risers welded or permanently screwed to its top surface such that the risers are oriented at an angle to each other, most preferably in a perpendicular orientation, i.e. at a 90 degree angle to each other. In another embodiment, the frame of the dolly is comprised of a rectangular shaped plate with a plurality of risers welded or permanently screwed to its top surface in an orientation and pattern which approximates an L-shape. A person with ordinary skill in the art will appreciate that the shape, size, orientation, and number of the risers will vary based on the requirements of the dolly and the object(s) being transported.

The dolly plate's bottom surface includes a hole or a plurality of holes that are routed into the plates surfaces with a depth and shape that is arranged to accept an industrial magnet or a plurality of industrial magnets that are partially incased in a metal plated finish and attached to the bottom surface of the plate by a fastening cap or a plurality of fastening caps that are pressed into or welded to the bottom surface. The industrial magnet(s) have a flat top and bottom surface and may be of any size or shape. The magnet(s) may be of such size(s) that the total surface area of the top surface(s) of the magnet(s) may be 20%, 30%, 40%, 50%, 60%, 70%, 80%, or 90% of the surface area of the bottom surface of the dolly. A person with ordinary skill in the art will appreciate that the size, shape, and number of magnets will vary based on the requirements of the dolly and the object(s) being transported. In a preferred embodiment, the shape of the magnet corresponds to the shape of the frame of the dolly and is embedded in the center of the bottom surface of the dolly plate. In another preferred embodiment, the arrangement of the magnets corresponds to the shape of the frame of the dolly and the magnets are embedded in the bottom surface of the dolly plate. In another preferred embodiment, the surface area of the magnet(s) is at least 50% of the surface area of the bottom surface of the dolly.

The frame of the dolly may be a variety of shapes, including square, rectangular, circular, and triangular. The frame of the dolly includes a plurality of caster fastening holes at each corner or, where the frame is circular, a plurality of caster fastening holes, corresponding to at least three stem fitted swivel casters, appropriately spaced parallel to the edge of the frame. The caster fastening holes are arranged to accept a corresponding plurality of stem fitted swivel casters. The swivel casters wheels are mounted to the frame by inserting each swivel caster wheel into corresponding caster fastening holes at the frames bottom and bolting each swivel caster wheel at the frames top by a plurality of corresponding spring washers, lock washers, and hexagon shaped nuts.

Referring now to a preferred embodiment in more detail, in FIG. 1, there is shown a dolly 10 having a rectangular shaped plate 12 with a L-shaped angle riser 14 welded or screw to the top surface of the plate. The caster fastening holes 16 are arranged to accept a corresponding plurality of stem fitted swivel casters 40. The stem fitted swivel casters wheels 40 are mounted to the frame by inserting each swivel caster wheel 40 into corresponding caster fastening holes 16 at the frames bottom 18 and bolted at the frames top by a plurality of corresponding spring washers 30, lock washers 32, and hexagon shaped nuts 34.

Figure 2:
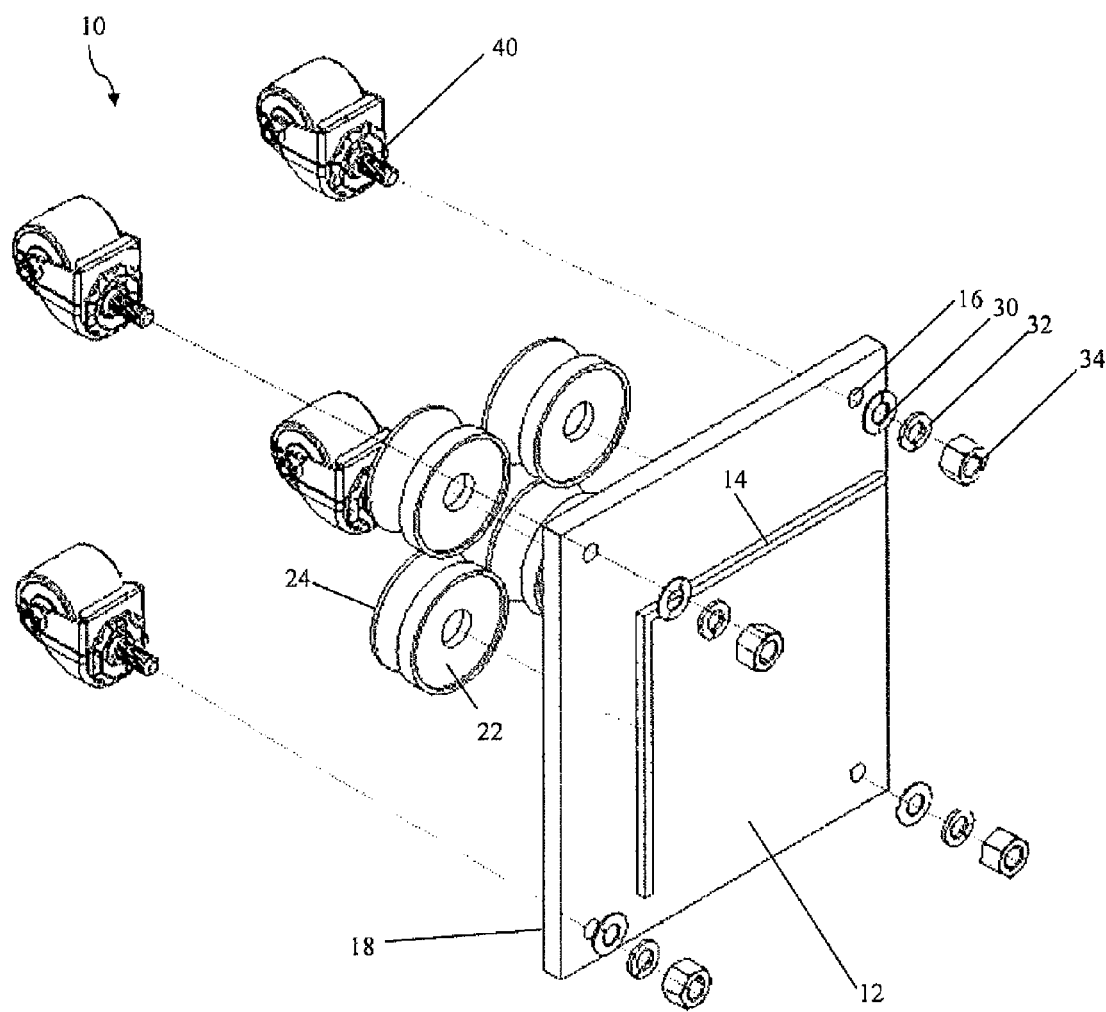
FIG. 2 is an expanded upper perspective view of a dolly according to a preferred embodiment.

FIG. 2 shows an expanded upper perspective view of a dolly according to the preferred embodiment, showing in further detail the attachment of the stem fitted swivel casters. The dolly 10 includes a plurality of caster fastening holes 16 at each corner. The caster fastening holes 16 are arranged to accept a corresponding plurality of stem fitted swivel casters 40. The stem fitted swivel casters wheels 40 are mounted to the frame by inserting the stem of each swivel caster wheel 40 into corresponding caster fastening holes 16 at the frames bottom 18 and bolting at the frames top surface by a plurality of corresponding spring washers 30, lock washers 32, and hexagon shaped nuts 34.

The construction details of the preferred embodiment as shown in FIG. 1 and FIG. 2 are that the dolly 10 may be made of any sufficiently rigid and strong material such as heavy duty rated aluminum, high-strength plastic, steel, metal, and the like. In a more preferred embodiment, the dolly 10 is constructed of heavy duty rated aluminum. Further, the placement of the routed L-shape riser can alternate sides according to use and may take the form of two or more risers arranged to form an L-shaped pattern.

Figure 3:
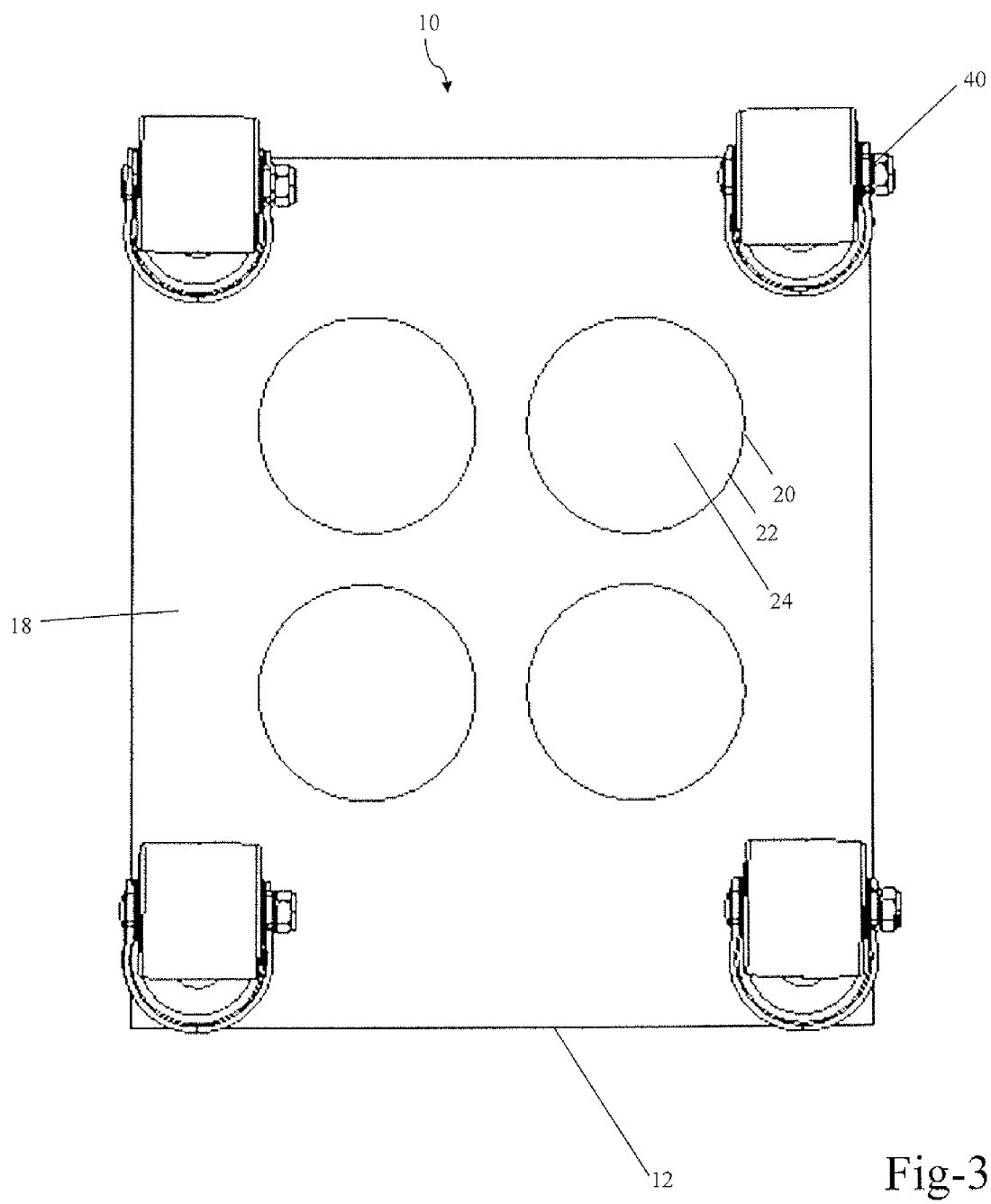
FIG. 3 is a bottom view of a dolly according to a preferred embodiment.
Figure 4:
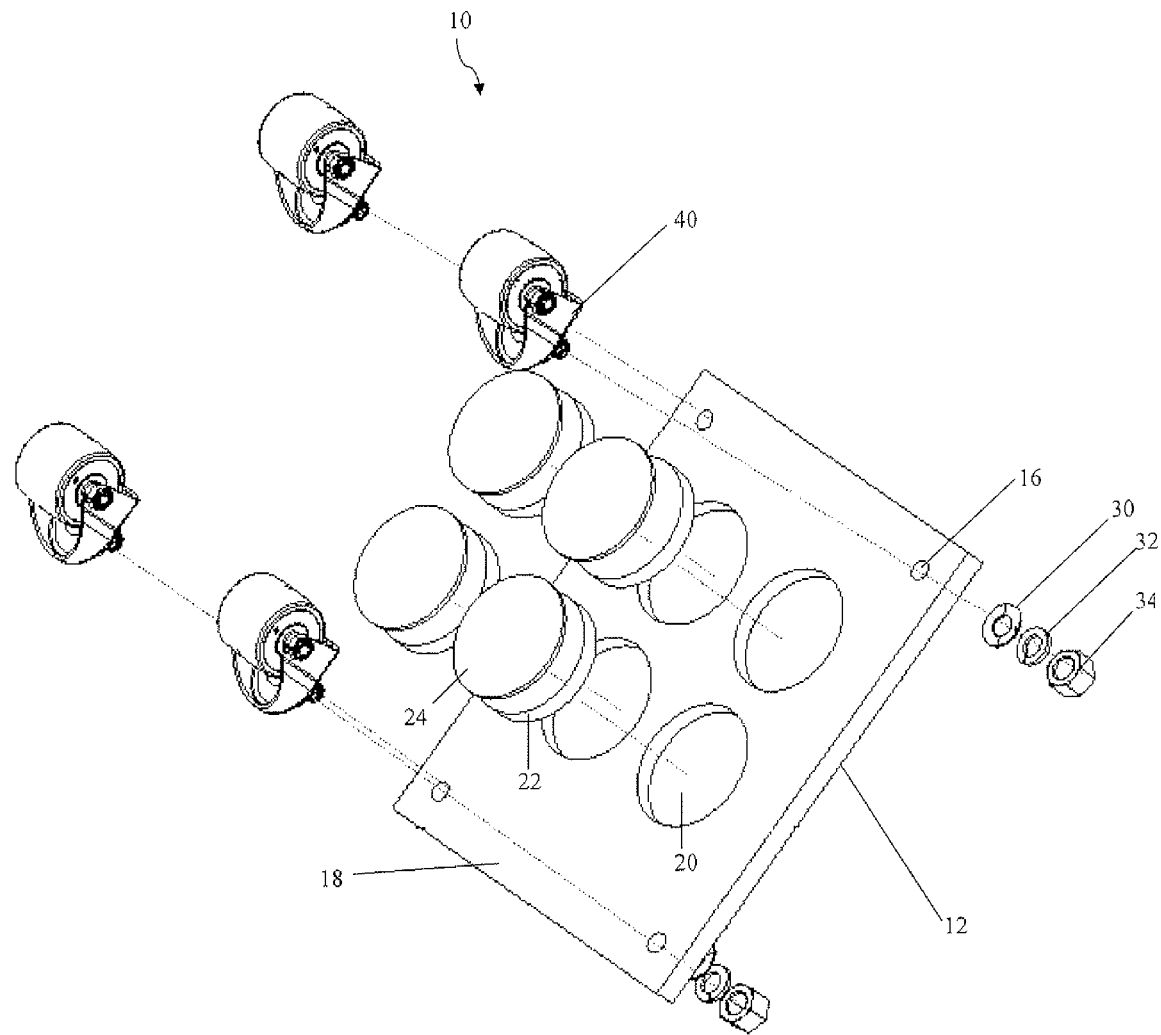
FIG. 4 is an expanded bottom perspective view of a dolly according a preferred embodiment.

Referring now to FIG. 3 and FIG. 4 there is shown the bottom view of the dolly 10. FIG. 3 and FIG. 4 show the rectangular shaped plate 12 which includes a plurality of caster fastening holes at each corner 16 and the bottom view of the plurality corresponding caster swivel wheels 40. FIG. 3 and FIG. 4 also show a plurality of holes 20 that are routed into the bottom surface 18 of the plate that are arranged to each accept a correspondingly shaped heavy duty industrial magnet 22. The heavy duty industrial magnets are partially incased in a metal finish and attached to the bottom surface 18 of the plate by a fastening cap 24 or a plurality of fastening caps 24 that are pressed into or welded to the bottom surface.

Furthermore, a system of four of the heavy duty wheeled corner skate dollies, such as the dollies of the embodiments described above, may be used to transport a rectangular heavy ferromagnetic or non-ferromagnetic object, in which each of the four dollies received a corner of the object and the industrial magnet(s) and/or the riser(s) ensure that the object is secure, while the fitted swivel casters allow the object to be moved manually. Further, heavy ferromagnetic or non-ferromagnetic objects of any geometric shaped may be moved using a system of casters provided that the riser(s), if present, are configured to receive the corners of the object being moved. Two embodiments of such a system are described below.

One embodiment encompasses a system for transporting a rectangular ferromagnetic object, such as a shipping container. In this embodiment, four dollies, each being comprised of: a) a dolly frame comprising a heavy duty plate with at least one caster fastening hole in each corner for receiving corresponding stem fitted caster swivel wheels, the stems of which are inserted into the corresponding caster fastening holes at the bottom of the rectangular plate and bolted to the top of the rectangular plate by at least one corresponding spring washer, lock washer and hexagon shaped nut; b) a L-shaped riser that is disposed on a top surface of the plate and attached to the top surface by screws or welding; and c) the plate having at least one industrial magnet disposed within said plate or on a bottom surface of said plate. On each dolly of the system, the L-shaped riser and at least one industrial magnet are configured to secure in place a corner of a rectangular ferromagnetic object on top of the heavy duty plate during transport. Thus, with each of the four dollies retaining a corner of the rectangular ferromagnetic object, the object can be moved manually over a flat surface.

In another system embodiment, a system for transporting a triangular ferromagnetic object is contemplated. In this embodiment, three dollies, each being comprised of: a) a dolly frame comprising a heavy duty plate with at least one caster fastening hole in each corner for receiving corresponding stem fitted caster swivel wheels, the stems of which are inserted into the corresponding caster fastening holes at the bottom of the rectangular plate and bolted to the top of the rectangular plate by at least one corresponding spring washer, lock washer and hexagon shaped nut; b) an acutely angled L-shaped riser that is disposed on a top surface of the plate and attached to the top surface by screws or welding; and c) the plate having at least one industrial magnet disposed within said plate or on a bottom surface of said plate. On each dolly of the system, the acutely angled L-shaped riser and at least one industrial magnet are configured to secure in place a corner of a triangular ferromagnetic object on top of the heavy duty plate during transport. Thus, with each of the four dollies retaining a corner of the triangular ferromagnetic object, the object can be moved manually over a flat surface.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A dolly comprising:
   a dolly frame comprising a plate,
   a L-shaped riser that is disposed on a top surface of the plate, and
   the plate having at least one industrial magnet disposed on a bottom surface of said plate,
   the L-shaped riser and at least one industrial magnet being configured to retain a corner of a rectangular ferromagnetic object in place on top of the plate during transport.

2. The dolly according to claim 1, the plate having at least one hole routed into a bottom surface of the plate corresponding to the at least one industrial magnet, and
   wherein said at least one industrial magnet is inserted into the corresponding routed hole and thereby attaches to the bottom surface of the plate.

3. The dolly according to claim 1, wherein said industrial magnet is partially incased in a metal finish.

4. The dolly according to claim 2, wherein said industrial magnet is attached to the bottom surface of said plate by at least one fastening cap.

5. The dolly according to claim 4, wherein the at least one fastening cap is pressed into the bottom surface of said plate.

6. The dolly according to claim 4, wherein the at least one fastening cap is welded to the bottom surface of said plate.

7. The dolly according to claim 1, wherein the L-shaped riser is screwed to the top surface of said plate.

8. The dolly according to claim 1, wherein the L-shaped riser is welded to the top surface of said plate.

9. The dolly according to claim 1, wherein the plate is rectangular in shape,
   wherein the rectangular plate has at least one caster fastening hole in each corner for receiving corresponding stem fitted caster swivel wheels,
   the stems of said stem fitted caster swivel wheels are inserted into the corresponding caster fastening holes at the bottom of the rectangular plate,
   each stem of the stem fitted caster swivel wheels are bolted to the top of the rectangular plate by at least one corresponding spring washer, lock washer and hexagon shaped nut.

10. A system for transporting a rectangular ferromagnetic object comprising:
    four dollies, each being comprised of;
    a dolly frame comprising a rectangular plate having at least one caster fastening hole in each corner for receiving corresponding stem fitted caster swivel wheels,
    the stems of said stem fitted caster swivel wheels are inserted into the corresponding caster fastening holes at the bottom of the rectangular plate,
    each stem of the stem fitted caster swivel wheels are bolted to the top of the rectangular plate by at least one corresponding spring washer, lock washer and hexagon shaped nut,
    a L-shaped riser that is disposed on a top surface of the plate, and
    the plate having at least one industrial magnet disposed on a bottom surface of said plate,
    the L-shaped riser and at least one industrial magnet being configured to retain a corner of a rectangular ferromagnetic object in place on top of the rectangular plate during transport,
    with each of the four dollies retaining a corner of the rectangular ferromagnetic object.

* * * * *